Patent Number: 4,682,236
Date of Patent: Jul. 21, 1987

[54] READ AND CLEAR READOUT CIRCUIT AND METHOD OF OPERATION OF AN IR SENSING CHARGE INJECTION DEVICE

[75] Inventors: Samuel C. Wang, Liverpool; John M. Swab, Baldwinsville; Michael L. Winn, Liverpool; Martin D. Gibbons, Camillus, all of N.Y.

[73] Assignee: General Electric Company, Syracuse, N.Y.

[21] Appl. No.: 811,474

[22] Filed: Dec. 20, 1985

[51] Int. Cl.⁴ .............................................. H04N 3/14
[52] U.S. Cl. .......................... 358/213.26; 358/213.31
[58] Field of Search ............... 358/212, 213, 167, 294; 357/24 CR

[56] References Cited

U.S. PATENT DOCUMENTS

| | | | |
|---|---|---|---|
| 4,316,221 | 2/1982 | Swab | 358/213 |
| 4,336,557 | 6/1982 | Koch | 358/213 |
| 4,380,755 | 4/1983 | Endlicher et al. | 358/213 |
| 4,527,200 | 7/1985 | Takahashi et al. | 358/213 |
| 4,547,806 | 10/1985 | Herbst et al. | 358/213 |

*Primary Examiner*—Gene Z. Rubinson
*Assistant Examiner*—Stephen Brinich
*Attorney, Agent, or Firm*—Richard V. Lang; Carl W. Baker; Fred Jacob

[57] ABSTRACT

The invention relates to a read and clear readout circuit and a method of operation of an IR sensing array. The invention eliminates "readout circuit lag" which reduces transient response for an individual sensor, and reduces angular resolution of an array. "Readout circuit lag" also emphasizes longer duration IR background causing unwanted saturation and restriction of the dynamic range. Readout circuit lag arises from the capacitance of the sensor elements and the capacitance of the readout circuit at a node to which the sensor elements are periodically coupled for readout, the IR induced charge being partitioned between these capacitances, with that attributable to the sensor capacitance not being injected, causing readout circuit lag. Elimination of such lag is achieved by following each readout step, with a clear or clear and skim step that removes charge to the clear level or to the skim level, precluding the lag earlier described.

8 Claims, 11 Drawing Figures

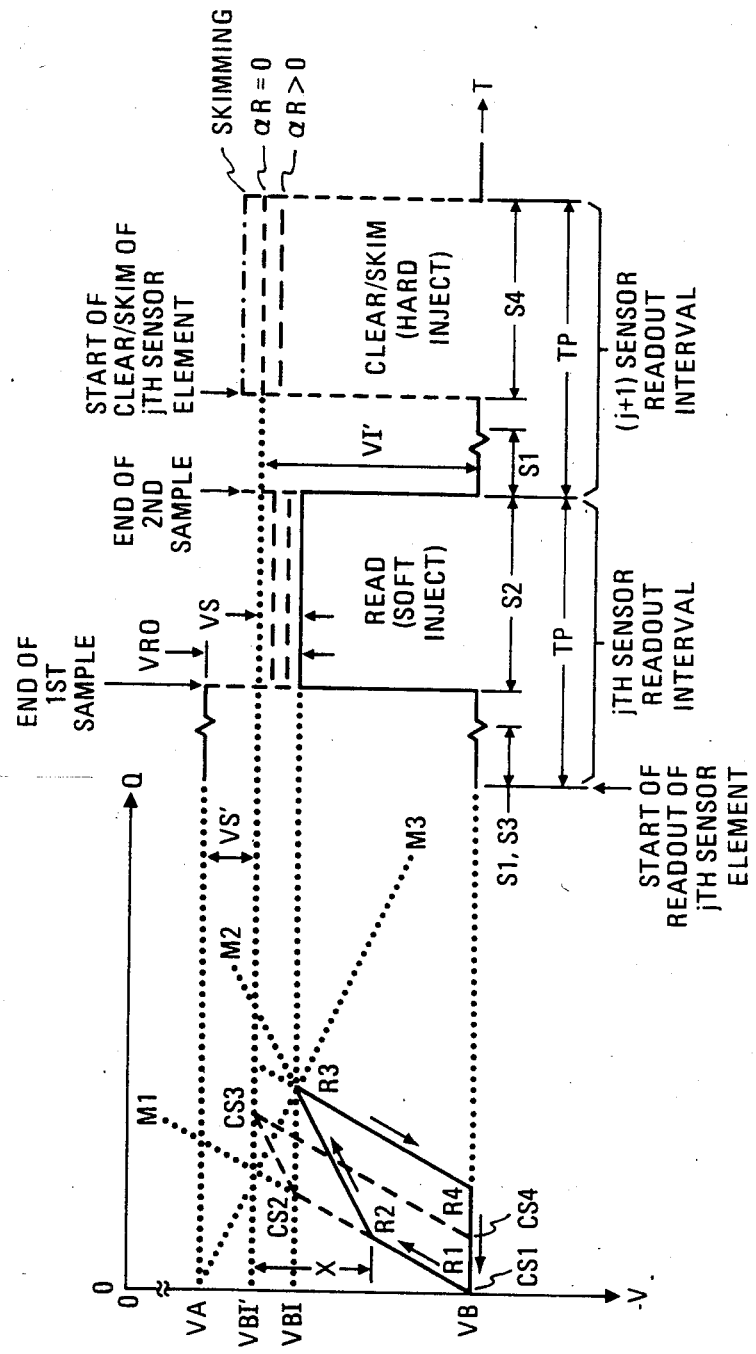

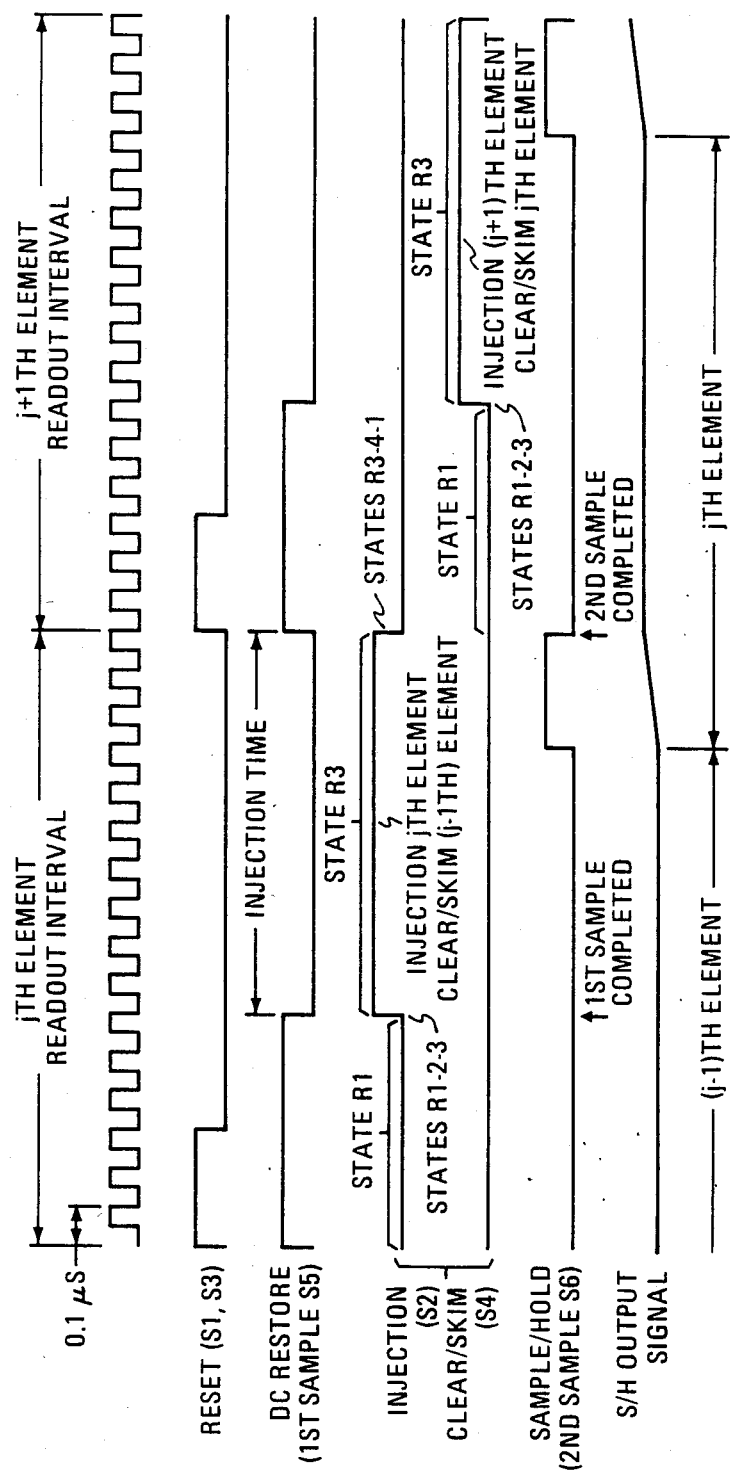
FIG. 3 ELEMENTAL TIMING WAVEFORMS FOR DCI READOUT

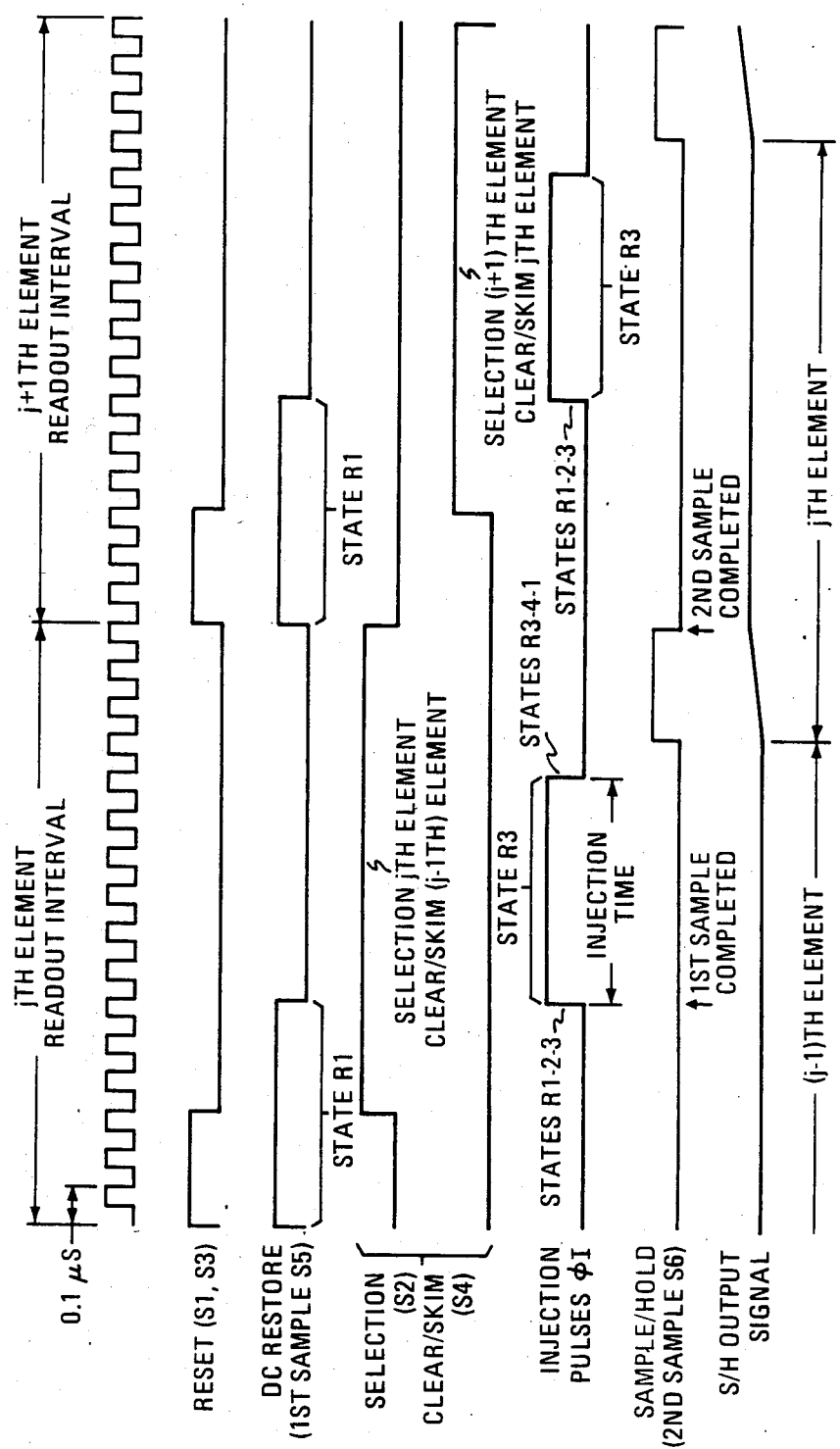

READ AND CLEAR READOUT CIRCUIT AND METHOD OF OPERATION OF AN IR SENSING CHARGE INJECTION DEVICE

The U.S. Government has rights in this invention pursuant to Contract No. N00014-81C-2153 issued by the U.S. Navy.

BACKGROUND OF THE INVENTION

1. Field of the Invention

The invention relates to charge injection devices optimized for IR sensing and more particularly to an improved readout circuit for a linear IR sensing array.

2. Prior Art

IR sensing CID arrays are well known, the sensor substrate material often being Indium Antimonide (InSb) or mercury cadmium telluride (HgCdTe). These materials are compound semiconductors which are doped to achieve a desired impurity level. When exposed to IR, photon collisions create hole-electron pairs in the substrate. In the usual construction, an electrode is applied to the under surface of the substrate, and an oxide layer is applied to the upper surface of the substrate, followed by a transparent electrode connected with a particular sensor element of the array on the upper surface of the oxide. The sensor element, with its insulated electrode, when suitably reversely biased, stores IR induced charges (the holes) in a potential well. If the reverse bias is removed, the charges are injected into the substrate emptying the well. Readings reflecting the IR induced charge on the sensor may be taken before and after injection if one wishes to measure the IR intensity. In practical devices, there are a large number of elements, as in a linear IR array, and a large number of readings are taken in a relatively short time. In practice, each reading of a sensor element is a double sample, and the readout process requires that the charge stored in the potential well be "injected" into the substrate.

In direct charge injection, to which the present invention has application, injection is incomplete, and the uninjected charge introduces several deleterious consequences in the output signal of the CID. While the basis for incomplete injection is more completely dealt with subsequently, one may say that it arises from the nature of the injection process. During IR exposure, IR induced charges are stored in the potential well of the sensor elements of the array. The sensor elements each have a capacitance typically one to ten picofarads. The IR induced charge, when derived from the sensor element is coupled to a node to which other sensor elements are coupled on occasion, and to which the input of a common preamplifier is connected. The preamplifier node also possesses a capacitance usually of several picofarads. In the direct charge injection process, the sensor element and node are preset to different voltages, the sensor element to a larger negative voltage which facilitates storage of IR induced charge, and the preamplifier node to a voltage which—when the two are interconnected, is sufficiently positive to inject the charges out of the well and into the substrate. When the interconnected circuitry reaches an equilibrium state, the voltage at both the sensor and the preamplifier node are equal. At the same time, the IR induced charge is found to be not all injected. A portion of IR induced charge, roughly proportional to the ratio of the capacitance of the sensor element to the sum of the capacitances of the sensor element and the preamplifier node, remains in the sensor element. In the example the proportion of retained charge to IR induced charge, which is called readout circuit lag (alpha$_R$) can be as high as 50%.

There are several adverse effects from readout circuit lag. One adverse effect is reduced transient response for an individual sensor, and in the array a reduction of angular resolution. Another adverse affect is the tendency to emphasize larger duration IR background, an effect which on occasion drives the sensor element into saturation and restricts its dynamic range.

SUMMARY OF THE INVENTION

Accordingly it is an object of the present invention to provide an improved readout circuit in a charge injection device (CID) for IR sensing.

It is another object of the invention to provide a readout circuit in a CID for IR sensing having zero readout circuit lag.

It is still another object of the invention to provide an improved method of operating a charge readout circuit in a CID for IR sensing.

it is a further object of the invention to provide a method of operating a charge readout circuit in a CID in which the adverse effects of charge, not removed from the sensor elements, during readout are eliminated or background charge skimming is facilitated.

These and other objects of the invention are achieved in the operation of a (CID) for IR sensing eliminating readout circuit lag in which the CID comprises n IR sensor elements arranged in an array on a common substrate, each sensor element when reversely biased to a first voltage forming a potential well in which IR induced charges are stored, and a readout circuit having n input terminals, each connected to a sensor element, amplification means, and a node connecting a sensing line and the input of said amplification means. The sensor element and the node each exhibit a capacitance between which charge is partitioned during readout with the part attributable to the sensor capacitance not being injected. This non-injected charge is the cause of "readout circuit lag".

The novel readout circuit, which eliminates readout circuit lag, comprises means for simultaneously biasing all sensor elements to a first voltage and the node to a second voltage, the second voltage having a value suitable for removing charge from the potential wells of the sensor elements; and means for injecting IR induced charges stored in a selected jth sensor element into the substrate by connection to the node to equalize their voltage.

Sampling means are provided for obtaining a first sample of the voltage on the node after the node has been reset and second sample of the voltage on the node during injection. When the second sample is combined subtractively with the first sample, the readout value for the jth sensor element is obtained.

Means are also provided for clearing, or clearing and skimming IR induced charges stored in the jth sensor element while a subsequent sensor element is being read out.

Preferably readout occurs for the jth element on the (jth) timing means output, and the clearing or clearing and skimming for the jth element occurs on the (j+1)th timing means output.

The novel method of operation of the readout circuit as outlined above is also claimed.

BRIEF DESCRIPTION OF THE DRAWINGS

The invention and distinctive features of the invention are set forth in the claims of the present application. This invention itself, however, together with further objects and advantages thereof, may best be understood by reference to the following description and accompanying drawings in which:

FIGS. 2A, 2B and 2C deal with the operation of the invention in deriving the signal from a single element of the sensor array, FIG. 2A being an equivalent circuit representation of the sensor element and readout circuit; FIG. 2B being a V/Q diagram of successive electrical states in the readout process including the novel readout and clear/skim operation; and FIG. 2C being an idealized electrical waveform illustrating both the voltage at the sensor element and at the input to a preamplifier during the readout process;

FIG. 3 illustrates the timing waveforms applicable to the DCI readout and clear/skim operation of an element of the sensor array;

FIG. 9 illustrates the timing waveforms applicable to the ACI readout and clear/skim operation of an element of the sensor array.

DESCRIPTION OF THE PREFERRED EMBODIMENT

Figure 1:
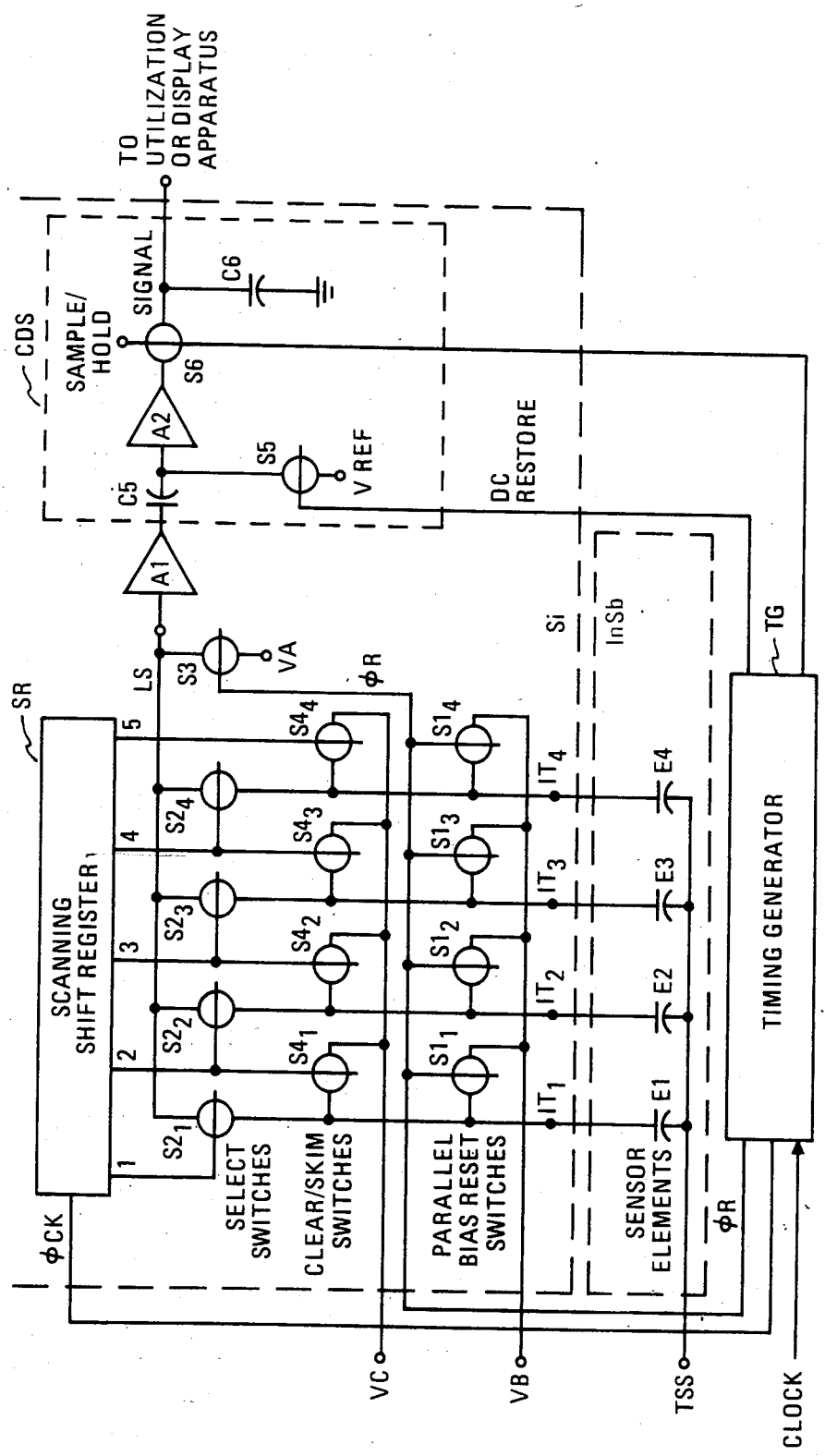
FIG. 1 is a diagram of a charge injection device (CID) for IR sensing including an IR sensor and a novel DC-coupled injection (DCI) readout circuit which eliminates readout circuit "lag" of a CID device.

Referring now to FIG. 1, a linear charge injection device (CID) for infrared (IR) sensing is shown combining a linear IR sensor array with a readout circuit for electrically scanning the array in accordance with a first embodiment of the invention. The sensor array is typically formed on a first integrated circuit of IR sensitive material typically Indium Antimonide (InSb), while the readout circuit is formed on a second, separate integrated circuit of silicon.

The CID forms a portion of a larger system in which an infrared image of an object field is formed. The readout circuit, which electronically scans the elements of the array, permits the formation of an individual line of an image of the object field. The resolution of the image measured along the line of elements is proportional to the number of elements. To complete the image, mechanical means are provided to cause the line of the object field imaged on the CID array to be swept in a direction transverse to the line image. A full area image of the object field is then formed by supplying the outputs of the readout circuit taken at successive imaging positions to a suitable display device. Here again the resolution of the image transverse to the line image is proportional to the number of imaging positions. Dependent upon application, the image display provides means to store elements (pixels) of the image for an appreciable portion of the scanning interval to create a full area image of the object field, optimally persistent for the nature of the display.

The IR sensing array consists of an "essentially" linear sequence of individual sensing elements of which four are illustrated (E-1 to E-4). It is understood that the actual array will entail a larger number of elements (e.g. 64, 128, 256, 512, etc.). The individual sensor elements are two terminal devices approximately represented in FIG. 1 by capacitors. A more descriptive representation of a sensor element is provided in FIG. 2A, in which the representation includes two capacitors CO and CD and optionally a diode D and variable voltage source (VD).

The sensor array has an IR active substrate typically 0.020 inch thick which has a resistivity suitable for CID operation. The undersurface of the substrate is electroded to provide a contact common to all sensor elements leading to a terminal $T_{ss}$. The terminal $T_{ss}$ may be led to the top surface of the substrate. The region of the substrate which is active in the IR sensing, is a very thin region rarely more than a few microns in thickness, at the top near the interface with an oxide layer, yet to be described.

The second terminal for each element of the sensor array is provided by a metal-insulator-semiconductor (MIS) gate of which the uppermost layer is an IR transparent conductive layer of chromium (i.e. M), and the undermost layer of insulating silicon dioxide (i.e. I). The "S" is the IR sensitive substrate material (e.g. InSb). The insulating $SiO_2$ layer and the uppermost portion of the InSb enter into the IR sensing mechanism. Charges which are created in the IR sensing process are said to be stored in a "potential well" at their interface.

In addition to the "gates", patterned metallizations are required to provide the electrical connections illustrated in FIG. 1 for connecting the IR sensor elements to pads on the InSb chip for further connection to pads on the silicon readout chip.

As the drawing suggests, the preferred application of the invention is to a "linear" (as opposed to an area) array of sensor elements. The remainder of FIG. 1 deals with the novel readout circuit in which readout circuit lag is eliminated.

The novel readout circuit is the separate integrated circuit forming a second part of the CID device. It includes a timing generator (TG), and a scanning shift register (SR) operating at rates commensurate with the number of "pixels" in the image. The readout circuit is typically formed by a MOS process on a silicon substrate. It electrically scans the successive elements of the sensor array, controls the double sampling required to read out each sensor element and delivers a signal proportional to the intensity of the IR signal developed at the successive sensor elements in a serial format along a single path to the output terminal (TO) for the CID.

The readout circuit includes a number (n) of input terminals ($IT_{1,2,3...n}$) four only being illustrated, each connected to one of a corresponding number (n) of in the sensor array. The readout circuit elements in the sensor array. The readout circuit concludes with the single signal output terminal (TO), mentioned above.

The readout circuit depicted in FIG. 1 further comprises a first bias voltage source (VB), n controllable bias reset switches $S1_{1-n}$ for periodically biasing the n sensor elements of the array to integrate the charge created by IR exposure; a second voltage source (VA) coupled to the sensing line (LS) having a value tending to remove stored charge from the sensor elements and a switch (S3) for periodically applying the second source to the sensing line (LS); an n fold plurality of sensor select switches $S2_{n-1}$ for selecting the sensor element to be connected to the sensing line (LS) for readout, and a third voltage source (VC) having a value in excess of VB selected to remove charge remaining after readout from said well to a clear or skim condition, and n controllable clear/skim switches ($S4_{1,2,3,...n}$) for periodically clearing/skimming each sensor element, an amplifier (A1) coupled to the sensing line, and a correlated double sampling circuit (CDS) by which the amplified sensor outputs, derived sensor element by sensor element, are processed to obtain the output at terminal (TO).

The readout circuit just described is controlled by the timing generator. The timing generator is itself timed by a master clock. It produces the waveform phi ck for operating the scanning shift register SR used to control the sensor selector switches $S2_{1-n}$, the waveform phi R for controlling the reset switches $S1_{1-n}$ and S3, the DC restore and the sample and hold waveforms for the correlated double sampling circuit.

The bias voltage (VB) is applied to all sensor elements at the element readout (pixel) rate to maintain the charge storage capacity in all elements. As seen in FIG. 1, the (jth) input terminal of the sensor element connected terminal set ($IT_{1-n}$) of the readout circuit is connected to one terminal of the jth reset switch ($S1_j$) (and to one terminal to the jth select switch ($S2_2$) for eventual readout and to one terminal of the jth clear/skim switch $S4_j$). The other terminal of the bias reset switch ($S1_j$) is connected to the bias source (VB). The switch $S1_j$ is controlled by the reset waveform phi R illustrated in FIG. 3, which closes the switch and connects the jth sensor element to the bias source (VB) when the reset waveform goes high. The reset waveform goes high at the start of the element readout interval, and remains high during a preliminary portion (three clock intervals) of the element readout interval (1.6 microsecond = 16 clock intervals).

The IR induced charge, accumulated during the integration period at the sensor elements, is removed element by element and its removal is sensed on the sensing line (LS) coupled to the input of amplifier A1. The elements involved in sensing the stored charge are the switch (S3), the voltage source (VA), and the select switches ($S2_{1-n}$) with timing provided by the timing generator and shift register.

The select switches $S2_{1-n}$, whose first terminals are connected to the sensor elements ($E_{1-n}$), have their second terminals connected to the sensing line (LS) leading to the input of the amplifier (A1). The control inputs of the select switches are connected in order to the successive shift register (SR) terminals. The sensing line (LS) is also connected to one terminal of the amplifier reset switch S3 whose other terminal is connected to the voltage source (VA). The VA voltage is selected to remove the IR induced charge stored in the potential well of each sensor element. The control terminal of the switch S3 is connected to the timing generator which supplies the waveform phi R to effect sense line reset and amplifier input reset.

Resetting of the amplifier input occurs once for each sensing operation and is done in synchronism with the resetting of the bias resetting switches $S1_{1-n}$. Resetting standardizes the charge of the stray capacitance CA associated with the sensing line and amplifier input, and makes the reading of each element more accurate and less subject to variation due to variations in the signal level of the previously read element (cross talk).

The scanning shift register (SR), which selects successive sensor elements for readout, is controlled by the timing generator itself timed by a clock (not illustrated) to produce successive spaced logical highs on the n output terminals (five terminals only being illustrated), which are individually connected to the control terminals of the select switches ($S2_{1-n}$).

The readout of the individual sensor elements, will be described prior to describing the clear/skim operation which takes place for the jth sensor element on the (j+1)th readout interval and which involves the clear/skim switches $S4_{1-n}$. When the reset waveform phi R goes high at the beginning of the jth element readout interval, switch S3 connects the sensing line LS to VA, in readiness to allow the charge removal to take place. Switch S1, controlled by the same waveform, is synchronously resetting the jth sensor element to VB. Closure of S3 charges the stray capacitance CA at the sensing line, including the stray capacitance at the output terminals of the switches $S2_{1-n}$ S3, and at the input of the amplifier A1, to the voltage of VA. Resetting the sensing line and sensor element continues for three clock intervals. At the end of the sixth clock interval, the scanning waveform from the shift register goes high, turning on the select switch $S2_j$. The select switch $S2_j$, now turned on, couples the selected sensor element to the sensing line, the sensing line potential being above the bias potential. This causes the potential well in the selected sensor element to collapse, and the charge stored in the sensor element flows into the substrate, momentarily increasing the potential on the selected sensor element, and momentarily decreasing the potential at the amplifier input until an equilibrium voltage is reached, as generally illustrated in FIGS. 2B and 2C.

In the process of reading a voltage equilibrium, the charge in the potential well will not all flow out of the sensor element but will rather divide by a fraction alpha$_R$ dependent on the capacitance of the sensor element (CO and CD) and the capacitance at the node (CA) including the sensing line, and the amplifier (A1) input. This fraction alpha$_R$ which may be called the readout circuit lag, equals:

$$alpha_R = eta_R$$
$$alpha_L = [CO/(CO+CD)][CO/(CO+CA)],$$

eta$_R = CO/(CO+CD)$ being the depletion loading efficiency and alpha$_L = CO/(CO+CA)$, the injection pulse loading coefficient.

The retained charge causes a reduction in the amount of IR induced signal charge which can be withdrawn from the sensor and coupled to the node to which the sense line and preamplifier are coupled. The effect of the readout circuit lag as a function of capacitance on the node is graphed in FIG. 4. The vertical axis of the graph is the lag $alpha_R$ as a percentage proceeding from a hypothetical zero to 100%. The horizontal axis is the load capacitance in pico-farads from a hypothetical zero to 100 pico-farads. The calculated graph is based on the assumption that the capacitance CO of each element is 6.5 pico-farads and correspondings approximately to observed data points in which injection time is relatively long (3.5 microseconds) so as to reduce the effect of "device" lag to a negligibly small number. As illustrated in the graph, the amount of charge which remains approaches 50% when the load capacitance reaches minimum practical values and when the load capacitance assumes typical values on the order of 25 picofarads, the lag is in excess of 20%. Accordingly, if the readout circuit lag is to be minimized, one should increase the capacitance on the node well past the 30 picofarads perhaps towards 100 picofarads.

Figure 4:
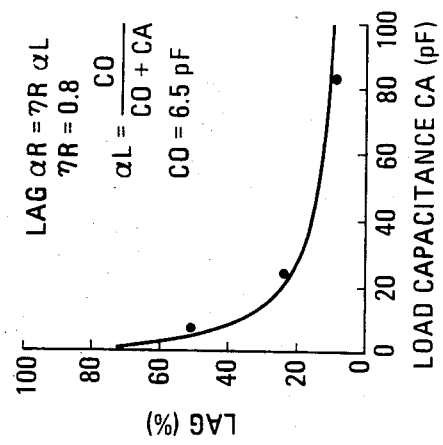
FIG. 4 is a graph used to explain readout circuit "lag" which is eliminated by application of the invention.

The FIG. 4 graph however, does not fully characterize the problem created, in that optimizing the readout circuit for minimum readout lag would suggest increasing the nodal capacitance and tend to increase the noise equivalent charge, which is approximately proportional to the product of a virtual noise generator (VN) (the preamplifier itself) and the input node capacitance (C). The noise equivalent charge (QN) which equals VN X C should accordingly be very small for optimizing signal to noise ratio. This may be also explained by noting that the larger the capacitance at the node the smaller the signal applied to the preamplifier input. Accordingly, the present invention provides a method of allowing a low noise readout utilizing a conveniently low input capacitance on the sense line and at a subsequent time removes the charge attributable to readout circuit lag so that in fact a reading may be taken in which readout circuit lag is zero.

The clear/skim operation entails the clear/skim switches $S4_{1, 2, 3, \ldots n}$, a source VC of a clear/skim voltage, which is larger than the voltage source VB being selected to remove the charge remaining after readout, and periodic timing provided by the shift register SR. More particularly, one terminal of each clear/skim switch $S4_j$ connected (as earlier noted) to a corresponding jth sensor element in the sensor array. The other terminal of each switch is connected to the terminal for connection to the source VC. The control terminal of each (jth) switch is then connected to the (j+1)th terminal of the scanning shift register. Thus, in the overall scanning operation, the readout process of the jth sensor element takes place at the same time that the voltage VC suitable for clearing out charge from the sensor is being applied to clear the prior (j−1) sensor element. As will be explained, the introduction of the clear/skim step in the subsequent sensor element readout interval, permits one to use a suitably low nodal capacitance to optimize the noise performance and still avoid the penalty of leaving charge in the potential well after readout.

Figure 2A:
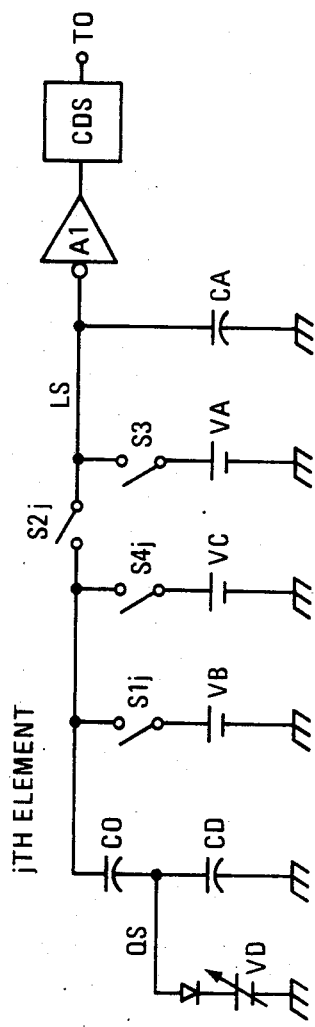

The voltage waveforms produced during the reading of the jth sensor element and the clear/skim operation of the (j−1)th sensor element are illustrated in FIG. 2C. The successive electrical states of the sensor element are illustrated in the V/Q diagram of FIG. 2B, while the equivalent circuit of the sensor element is provided in FIG. 2A.

FIG. 2A equivalently represents the sensor element as a two terminal, four component device. The capacitance of the oxide layer CO is illustrated connected in series with the capacitance of the depletion layer, CD, at the interface between the oxide and the InSb substrate. The capacitance CD is shunted by an ideal diode (D) in series with a variable voltage (VD). The shunting elements are attributable to the stored charge in the potential well created by a suitable reverse bias (VB). The equivalent circuit implies that when the variable potential well disappears, the battery VD, back biasing the diode (D) will also disappear. This allows the diode to be conductive for current flowing into the substrate, and to act as a short circuit in shunt with CD.

The readout circuit including the elements for reading and the clear/skim operation as applied to a single sensor element (the jth element) are illustrated in the remainder of FIG. 2A. The bias voltage source VB and the individual reset switch $S1_j$ are connected in shunt to the sensor terminals. Similarly the clear/skim voltage VC and the associated switch $S4_j$ are also connected in shunt to the jth sensor element. The node so far formed at the ungrounded terminal of the jth sensor element is then connected through the select switch $S2_j$ to the node associated with the sensing line LS and the input of the preamplifier A1. The reset voltage for the amplifier input node and the reset switch S3 are serially connected between that node and ground and the capacitance CA is represented as being present between the sense line node and ground. The output of the preamplifier A1 is then coupled via the correlated double sample circuit to the signal output terminal TO.

The lines in FIGS. 2B and 2C represent the voltage/charge (V/Q) states, and voltage/time (V/T) states respectively of the affected sensor element, and of the node at the preamplifier input including the sensing line (LS). In FIG. 2C, the time scale allows for two readout intervals. In FIG. 2B, the solid lines interconnected to form a closed four sided figure represent the successive states of the jth sensor in the V/Q domain during read or soft inject operation, while the dashed lines interconnected to form a closed four sided figure represent the successive states of the (j)th sensor in the V/Q domain during clear/skim operation. In FIG. 2C, the lines which appear as pulses rising from the VB pedestal during the two intervals depicted, represent the voltage on the jth sensor element as a function of time. One may also understand that the dashed lines which appear as a pulse descending from the voltage VA during the leftmost interval represent the voltage on the node associated with the preamplifier as a function of time. During read operation of the jth sensor element, $S2_j$ interconnecting the jth sensor element with the preamplifier is closed, causing the voltage on the sensor element to rise, and the voltage on the preamplifier node to fall as they reach equilibrium at a common voltage.

In FIG. 2C, the dashed lines which appear as pulses rising from the VB pedestal during the right most readout interval represent the voltage on the (j)th sensor element as a function of time for clear/skim (hard inject) operation. Since the clear/skim operation takes place with the switch $S2_j$ open, there is no accompanying change in the voltage at the preamplifier node.

FIG. 2B is a simplified piecewise linear treatment of the readout and clear/skim operation. As seen in the solid line V/Q diagram of FIG. 2B, the sensor element is at the initial state R1 at coordinates (VB, 0) of a four state readout cycle after resetting. At the initial state R1, the bias voltage VB has the most negative value that it experiences during the cycle, and the relative charge Q is assumed to be zero. There is, of course IR induced charge in the potential well, whose amount will be disclosed at R2. At the instant that injection begins, the potential well begins to diminish. The first line segment is traced as both the Q and V coordinate increases at a slope corresponding to the quantity M1. The quantity M1 is the reciprocal of the capacitance of the sensor element when the potential well is present, (i.e. diode D is back biased by VD):

CM = CO CD/(CO + CD).

As the potential well continues to diminish, the capacitance CD attributable to the well is removed as the diode contact and short circuits it. This changes the slope of the V/Q graph at R2, and the second line segment has the slope M2, corresponding to the reciprocal of CO, the capacitance of the oxide alone.

Meanwhile at the preamplifier node, charge (Q) is flowing out of the stray capacitance CA and into the capacitance of the sensor element. The V/Q diagram of the preamplifier node in FIG. 2B is a dotted line having a downward slope M3. The initial state (VA, 0) of the sensing line is at a higher voltage than VB. The discharge from the initial state follows a path having a slope established by the reciprocal of CA. The downward slope continues to a point (R3) where the voltages on the sensing line and the sensor element are equal, denoting equalization; the third state in the readout cycle. Since the equalization results in a different level of injection depending on the charge in the potential well, it is called a "soft" injection.

After equalization, the readout cycle terminates with resetting taking place to return the sensor element to the initial state (R1) prior to "hard" injection. The switch S2$_j$ coupling the sensor element to the sensing line opens, and resetting potentials are applied to both the sensor element and to the preamplifier node via switches S1$_j$ and S3. The sensor element now charges in a path represented by the third solid line having a slope approximately equal to M1 and extending to the fourth (R4) state at the voltage VB. Upon reaching VB, the cycle closes with a fourth line leading to the initial state R1.

As the sensor element is being reset to the initial state, the stray capacitance CA at the preamplifier node is also reset to the initial voltage (VA). The dotted line previously used to indicate a discharging path from the initial state (VA, 0) with a slope M3, is now retraced along a charging path back to the initial state (VA, 0) having an equal but opposite slope.

The V/T waveforms that are produced during the soft inject readout cycle of the jth sensor element (just described) are also shown by dashed and solid lines in the left hand interval of FIG. 2C. For purposes of absolute signal level comparisons, a zero signal level is shown as a dotted line extending from VBI' in FIG. 2B. The "zero" signal level is defined to occur at a voltage equal to the voltage at the intersection (at voltage VBI') of an extension of the dashed sensor element line R1, R2 (extending from (VB, 0) at slope M1), and the dotted charge/discharge line of the sensing line extending from (VA, O) at negative slope M3. The extended V/Q sensor line, R1, R2 shown without a break in slope, symbolizes the case for an empty potential well, consistent with a zero signal.

The readout signal for the jth sensor element may be obtained from FIG. 2C. The voltage of the zero signal state, when transferred to FIG. 2C, assumes a dotted level (VBI') between VA and the equilibrium voltage (VBI). The "true" signal level referenced to the zero signal level is indicated by the notation VS. The actual signal read out is obtained by taking samples at the interval before soft injection and at the end of soft injection by the double sample circuit CDS at the times noted by the arrows. The signal obtained (VRO) is:

VRO = VA − VBI = VS' + VS.

Figure 5:
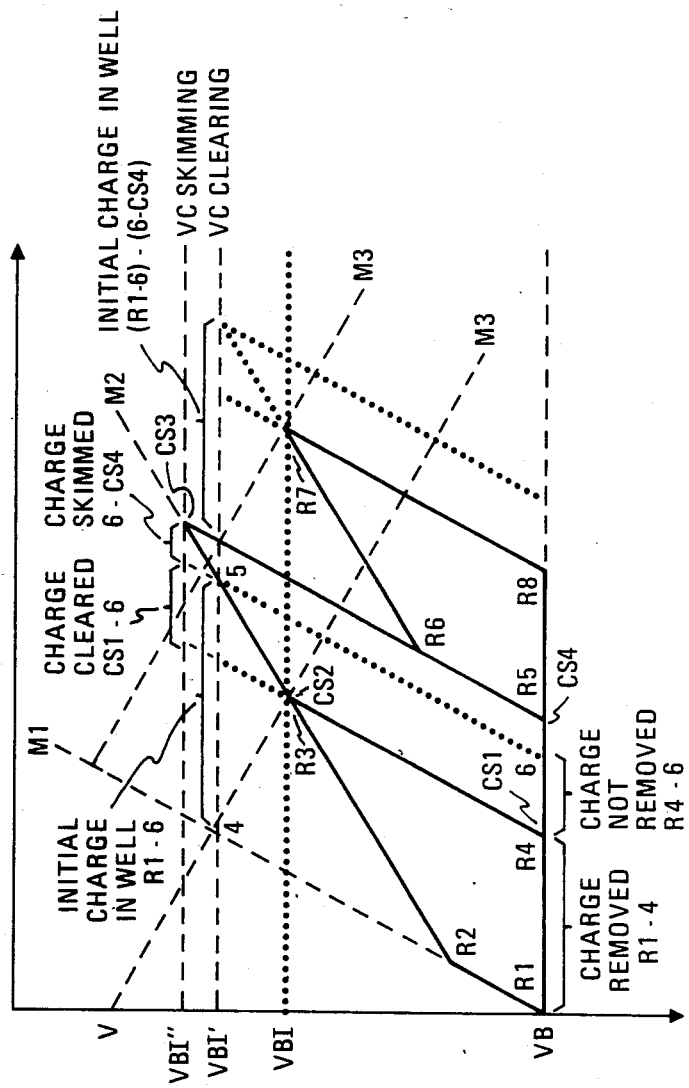
FIG. 5 is a V/Q diagram of the read and clear/skim operation during a short sequence consisting of a first read operation, followed by a second clearskim operation for the same sensor element, the sequence illustrating the effect of charge clearing/skimming on the succeeding readout operation.

In the readout process of the jth sensor, which has just been described, the accumulation of laggy charge at the sensor element following a single readout operation may be derived from the coordinate displacements of the FIG. 2B illustration. To illustrate the accumulation of charge more exactly and to illustrate the charge skimming operation, as yet to be described, FIG. 5 has been provided. FIG. 5 is a V/Q plot of a sensor experiencing slightly greater IR illumination than the sensor illustrated in FIG. 2B.

The read operation in FIG. 5, commences at the origin of the plot (R1) and continues to R2 at a slope determined by M1. This slope implies that the device is working as a simple capacitor without a charge injection, as earlier noted. At R2 the slope changes and continues to R3 at a new slope (M2), indicating continuous injection of charge. All charge would have been removed if the reading injection pulses had been "harder", i.e. equal to VBI'. The voltage VBI' represents the voltage at which all charge would have been cleared from the sensor element. The intersection of the line R2 R3 with the horizontal line VBI' thus defines the point that the readout would have had to reach to inject all charge out of the sensor. The Q coordinate distance between R1 R2 and the line 5, 6 represents the total amount of initial charge in the well. If charge is only cleared to the point R3, then uncleared charge occurs from R3 to point 5. Accordingly, during reset in the V/Q plot, when the lines R3 R4, and R4 R1 are retraced, the charge removed from the well is represented by R1, R4, and that not removed is represented by R4, 6 (on the same line of slope M1 as point 5). Were it not for the clearing/skimming operation shortly to be described, the next cycle of operation would show the knee corresponding to R2 placed closer to the VB line than before, indicating that the sensor has moved toward saturation, due to the increased charge left in the well.

The clear/skim (hard inject) operation which follows the read (soft inject) operation may be set either to "clear" the charge from the well, which would cause the prior states to be retraced assuming no change in light level or to skim the charge which is illustrated in FIG. 5. The effect of "clearing" the charge is to cause the next cycle to repeat at the same coordinates R1, R2, R3, R4, while the effect of skimming is to reduce charge below that which has been accumulated, making it appear that the IR background is weaker, and elevating the voltage of the point R2, at which the change in slope occurs.

FIG. 2B illustrates the effect of "clearing" the charge from the sensor element. The operation, as noted is performed on the jth sensor element in the next readout interval. Consistently the dashed waveform of FIG. 2B occurs at the next sensor readout interval.

The clear/skim operation for charge clearing as depicted in FIG. 2B commences at the point CS1 corresponding to the V/Q coordinates (VB, 0). The clear/skim line proceeds at the slope M1 until it intersects with the line VBI corresponding to the voltage level set by the load line at which soft injection took place on the prior cycle. At CS2 the slope changes to the slope M2, and continues until it intersects with the line VBI', corresponding to the voltage required to clear charge remaining in the sensor at CS3. At CS3 all charge has been removed from the well and the V/Q plot may be retraced from CS3 to CS4, and from CS4 to CS1 to complete the cycle. Should a further cycle be undertaken immediately, one would find that the break point would not occur until one got to the voltage corresponding to VBI'.

Should one allow the sensor to continue to be exposed to infrared radiation at the same intensity as before causing the same amount of charge to be accumulated, then the next readout cycle would encounter the points R1, R2, R3 and R4 in the same positions as before.

The clear/skim operation for charge skimming is depicted in FIG. 5. As already described, the first readout cycle is completed along the states represented by the lines R1, R2, R3 and R4. The initial charge in the well for the cycle is represented by the line 4, 5. The charge removed for the cycle R1–R4 is represented by the line R1, R4 and the charge not removed during the readout cycle by the line CS1-6.

If, however, the clearing voltage is increased to the skimming value depicted in FIG. 5, then the clear/skimming cycle proceeds from CS1 to CS2 at which point the slope changes to M2 and continues through the voltage VBI' at point 5 to the intersection with the skimming voltage VBI'' corresponding to the point CS3. The cycle concludes with the descending line CS3, CS4 and CS4 to CS1. The charge which is removed by this operation may be represented by the line CS1–CS4. If now the next readout cycle is graphed recognizing that the skim charge is represented by the distance 6, CS4, a new position occurs for the knee in the plot. The new readout cycle R5, R6, R7, R8 commences with the point R6 at a higher voltage than the previous R2. Assuming constant illumination, the effect of the skimming operation is to remove a pedestal beneath the signal and facilitates a more accurate treatment of the signal with a lower dynamic range requirement on the preamplifier.

The timing waveforms instrumental in the readout and clear/skim operation for examplary sensor elements are depicted in FIG. 3. Previously, in connection with FIGS. 2B and 2C, the events taking place at the jth element were discussed. In the FIG. 3 graph, the initial state R1 ideally exists to the end of the sixth clock interval, at which the second R2, and third R3 states of the sensor readout cycle depicted in FIG. 2B take place. The third, or equilibrium state R3 continues from the sixth to near the end of the jth readout interval during the sixteenth clock interval, (during an interval shorter than a clocking interval), the third or equilibrium state terminates, and the cycle quickly passes via the fourth state R4, to the original state R1. The initial (VB, 0) state is the removed CS1, which continues through the next six clock intervals of the clear/skim operation for the jth element.

Clear/skim operation, then continues for the remainder of the next interval, with the same time allocation for each segment of the V/Q diagram. The clear/skim switches $S4_{1-n}$, it will be remembered are controlled by the same waveform from the scanning shift register as is used for controlling the select switches S2 for injection, the difference being that the clear/skim switch is delayed one "tap" on the shift register, so that it uses the next sensor element timing interval after reading operation for clear/skim operation. This type of readout implementation is called "reach-back read and clear/skim".

As shown in FIG. 3, the reset time takes place during the first three clock intervals followed by three clock intervals for the reset state to equalize before injection. The injection initiated at the sixth clock interval continues to the 16th clock interval and it then terminates as reset for the next sensor element takes place and the cycle begins for that element.

The period between the third and sixth clock intervals and between the 14th and 16th clock intervals represents relatively stable periods in the cycle corresponding respectively to the reset and to the equilibrium states of the sensor-element and sensing line. Samples are taken of the voltage on the sensing line during these two periods, to obtain a reading of the IR induced charge on the selected (jth) sensor element.

The waveform on the sensing line, represented by the solid line graph of FIG. 2C, is amplified in the amplifier A1, and coupled to the capacitor C5 of the correlated double sampling circuit CDS as shown in FIG. 1. The CDS circuit measures the voltage swing on the sensing line between the reset and charge injected states, provides for DC restoration of the signal obtained from the sensing line and by the selection of the sampling provides substantial elimination of the "kTC" noise.

The sampling circuit comprises the elements C5, S5, A2, and S6, C6 which are connected in the following manner. The output of amplifier A1 is coupled to one terminal of the capacitor C5. The other capacitor terminal is connected to one terminal of a controlled switch S5, and to the input of the buffer amplifier A2. The other terminal of the switch S5 is connected to a suitable DC reference voltage VREF. The switch S5 is controlled by the DC restore waveform of FIG. 3. When the waveform goes high during the first six clock intervals, switch S5 is operated to take a "first sample". The output of the buffer amplifier is coupled to one terminal of a second controlled switch (S6). The other terminal of the switch S6 is connected to one terminal of the capacitor C6 (whose other terminal is grounded). The sample/hold waveform of FIG. 3 is coupled to the control of the switch S6. The waveform, which is high during the 14–16th clock intervals, allows the switch S6 to conduct during this period, charging capacitor C6, and obtaining a "readout" of the IR signal, representing the difference between the two samples taken during the jth element readout interval. The value read out is then coupled to the CID output terminal T0, where it represents the value for the jth element. The output of T0 is stored on capacitor C6 until the next readout interval at which time it is replaced by the value for the (j+1)th element.

The sensing line reading process, as mentioned earlier, is initiated by closure of the switch S5, which connects the voltage reference VREF, to the near terminal of the capacitor C5. At the first three clock intervals that the first sample is being taken, resetting of the sensing line to VA occurring and the capacitor C5 assumes a charge which establishes a desired voltage difference between VA and the other voltage at the input of the buffer amplifier A2. In practice, the DC restoration offset is set to approximate the zero signal condition. After discontinuance of reset, three more clock intervals are provided to allow the charges flowing into C5 to reach equilibrium. After the sixth clock interval, the sampling waveform goes low, opening the switch S5, and leaving the accumulated charge on C5. Leakage of charge is kept small by the selection of a suitably large capacitance for C5, and assurance that S5 and A2 are of suitably high impedance.

The sampling is quiescent during the initial period (clock intervals 6 to 13) that the IR induced charge on the sensor element is being injected into the substrate. At the 14th clocking interval, after injection is near completion, the sample/hold waveform of FIG. 3 goes high, and so remains until the end of the 16th clock interval (of the jth element readout interval). This closes the switch, S6, allowing capacitor C6 to be charged to a voltage equal to the equilibrium voltage VBI less the offset provided by the charge already present at C5. Thus the output reading $V_S$ is equal to the "true" signal in that undesired DC offsets in the readout process are removed.

At the end of the 16th clock interval, the charging process of C6 has stabilized, and the sample and hold signal goes low. The output is stored on capacitor C6, where the value persists into the 13th count of the readout interval of the (j+1)th sensor element. To insure that the reading is present sufficiently long, the capacitor C6 is made appropriately high (100 pf), and the utilization or display apparatus is of a suitably high impedance to sustain the signal over the readout interval for the sensor element.

Figure 6:
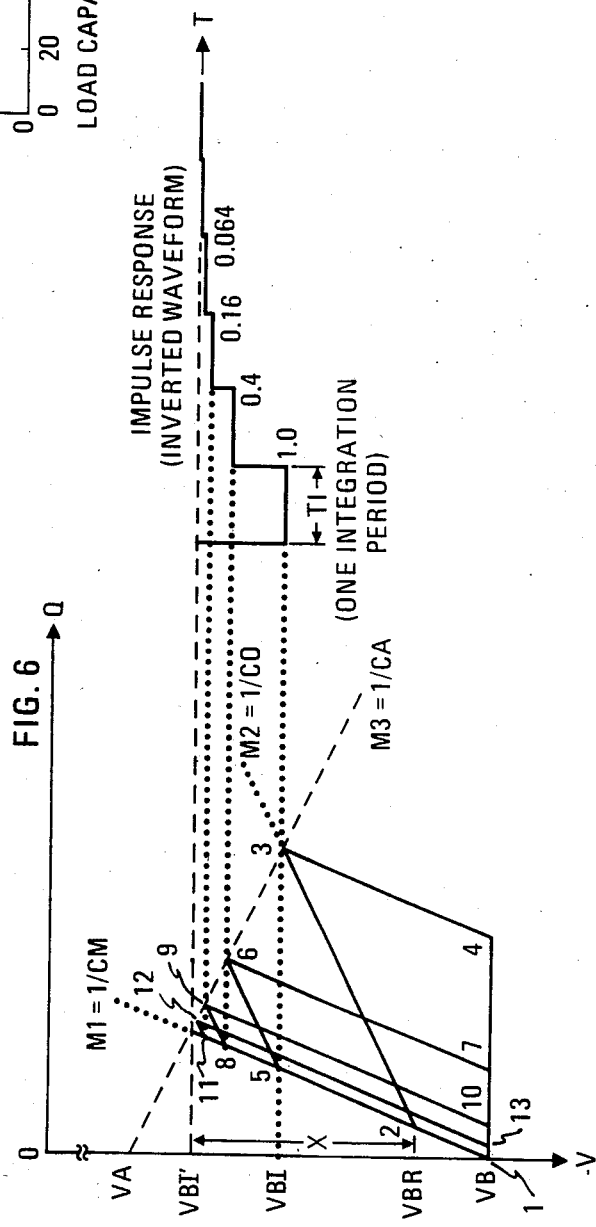
FIG. 6 is a V/Q diagram over several readout cycles of the poor transient response of sensor element readout circuitry to an IR pulse, i.e. readout circuit lag in the absence of clear/skim operation which eliminates the problem.

The response of readout circuitry to an IR pulse in the absence of the clear/skim operation is illustrated in FIG. 6 showing the effect of readout circuit lag. FIG. 6 graphs the successive readout intervals until the transient has decayed. Successive V/Q states are graphed to the left, and the corresponding V/T outputs are graphed to the right in the figure. The V/T graph illustrates the decay transient in the CID output as the result of an IR pulse of short duration. The V/T graph illustrates the successive readout states. In the first readout interval, the V/Q states are respectively 1, 2, 3, and 4. From the graph, in a manner similar to that previously, applied, one may determine the amount of IR induced charge, and the amount of charge removed (1-4) and the amount of charge not removed, (which is substantial). On the succeeding interval, assuming the IR pulse has terminated, the V/Q states are respectively 1, 5, 6, and 7, indicating that the amount of charge, corresponding to VBI, the previous injection voltage, has been removed, while the amount corresponding to VBI' (zero signal state) is yet to be removed. Accordingly the break in slope occurs at VBI corresponding to point 5 and the line at slope M2 effects a higher intersection on the load line, corresponding to lesser charge in the sensor element. At the second readout interval, more charge is removed, and some yet remains. The amplitude of the output for the second interval has fallen however to 0.4 of the first interval amplitude. Upon the third readout interval, the V/Q states are respectively 1, 8, 9, 10 implying further charge removal and a corresponding diminution of the CID output to 0.16. The last interval graphed is 1, 11, 12, 13 with a corresponding CID output of 0.064 units.

FIG. 6 illustrates the result of the lag upon the output response of the CID to an IR pulse. As explained in connection with FIG. 4, the lag $alpha_R$ is made up of a product of the quantity $eta_R$, which has a value of 0.8 in conventional devices, and the quantity $alpha_L$, the readout circuit lag. The voltage equalization process during readout will always produce this fractionalization of the charge—some of which is removed and some of which is not removed in the customary circuitry.

In the present invention, the charge non-removed during readout is removed after the first reading. Thus reading for CID readout takes place at the first readout interval (depicted in FIG. 2C), which produces the desired signal at the initial transient. On the next readout interval (in the array sequence) with the preamplifier disconnected, clearance occurs using hard injection, with a voltage equal (VBI') to that required to clear any remaining charge from the sensor element. The readout and clear/skim process fully clears the sensor element of remaining charge allowing the sensor element to be empty by the end of the second sensor readout interval, and thereby allowing IR signal charge to integrate for (n−1) of the sensor readout interval of the array. In the case where n is 64 or more, the loss in integration time is negligible.

The removal of the transient however, is complete assuming a "clear" setting of the voltage VC. If the CID output response were graphed in the manner of FIG. 6, the only pulse present would be the initial pulse of amplitude 1.0, and the remainder of the transient eliminated.

A second property of the novel circuit in the "clear" setting of the clear/skim circuitry is one of avoidance of detector saturation in the presence of a sustained IR signal (background). In the case of a high sustained IR signal, the unremoved charge may be sufficiently large, so that upon each succeeding readout, the breakover point may drop on successive readout intervals toward saturation. In saturation, the circuit becomes non-responsive for a sustained period to further rises or falls in the IR signal. The "clear" setting avoids this by causing the full clearance of stored charge at the next sensor interval at the beginning of the sensor charge integration interval.

Figure 7:
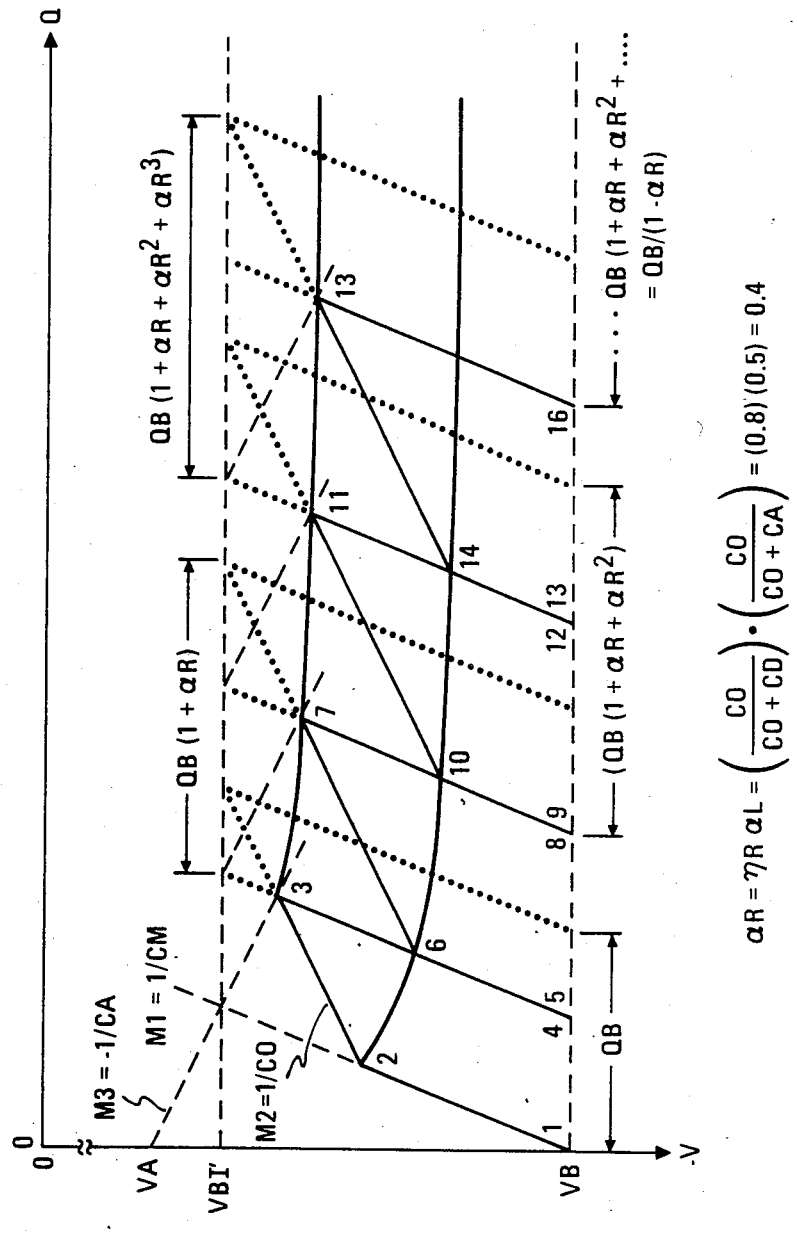
FIG. 7 is a V/Q diagram over several readout but without clear/skim operations, of the response of the sensor element readout circuitry to an IR step transient to a sustained high level, together with FIG. 5 illustrating the effect of readout and clear/skim operation in avoiding saturation attributable to readout lag, and also illustrating the capacities of the readout circuit to subtract a "pedestal" of IR background under an IR signal.

The effect of a sustained IR level is illustrated in FIG. 7. It is assumed to be moderate (not high) causing the break point (2) to occur at a reasonably high voltage. On the first readout interval, the V/Q states are 1, 2, 3, and 4. On the second readout interval the V/Q states are 5, 6, 7, and 8, showing a decline in the break point (6) toward saturation. On the third readout interval, the V/Q states are 9, 10, 11, and 12 showing a small but further decline in the break point toward saturation. The last readout interval 13, 14, 15, and 16 indicates the DC level that the break point would asymptotically approach. In the example, the system did not fall into saturation. Had a stronger signal been present, saturation would have been likely. However, the increased value at which the signal stabilized, which was approached after several scanning intervals, creates an increasing pedestal for sustained signals, tending to distort the amplitude of a sustained signal in relation to a pulsed signal. The pedestalling thus tends to emphasize sustained background IR, and to reduce the relative amplitude of the desired signal, when it is of a transient nature.

The operation of the clear/skim circuit, at the clear voltage setting prevents both effects just noted.

In addition, in the "skim" setting, the circuit can cause a decrementing rather than an incrementing output in the presence of a sustained signal. At the end of each pair of readout and clear/skim sensor intervals, additional charge may be removed, effectively subtracting charge, not yet integrated from the signal charge for the subsequent scan of the sensor element. This effect can be used to remove background from an IR signal, when the actual signal represents a small transient upon an undesirably large background.

In the FIG. 1 arrangement, whose operation has now been described, the removal of stored charge to the "clear" level allows for further optimization of the amplifier design. One may use smaller sensing line node capacitances to reduce the noise equivalent charge, without getting poorly transient response, more pedestal growth, or reduced dynamic range which FIG. 4 indicates would occur.

The charge skimming operation, dependent on setting provides a flexible way of discriminating against background, to facilitate reading of an IR signal over the background.

Figure 8:
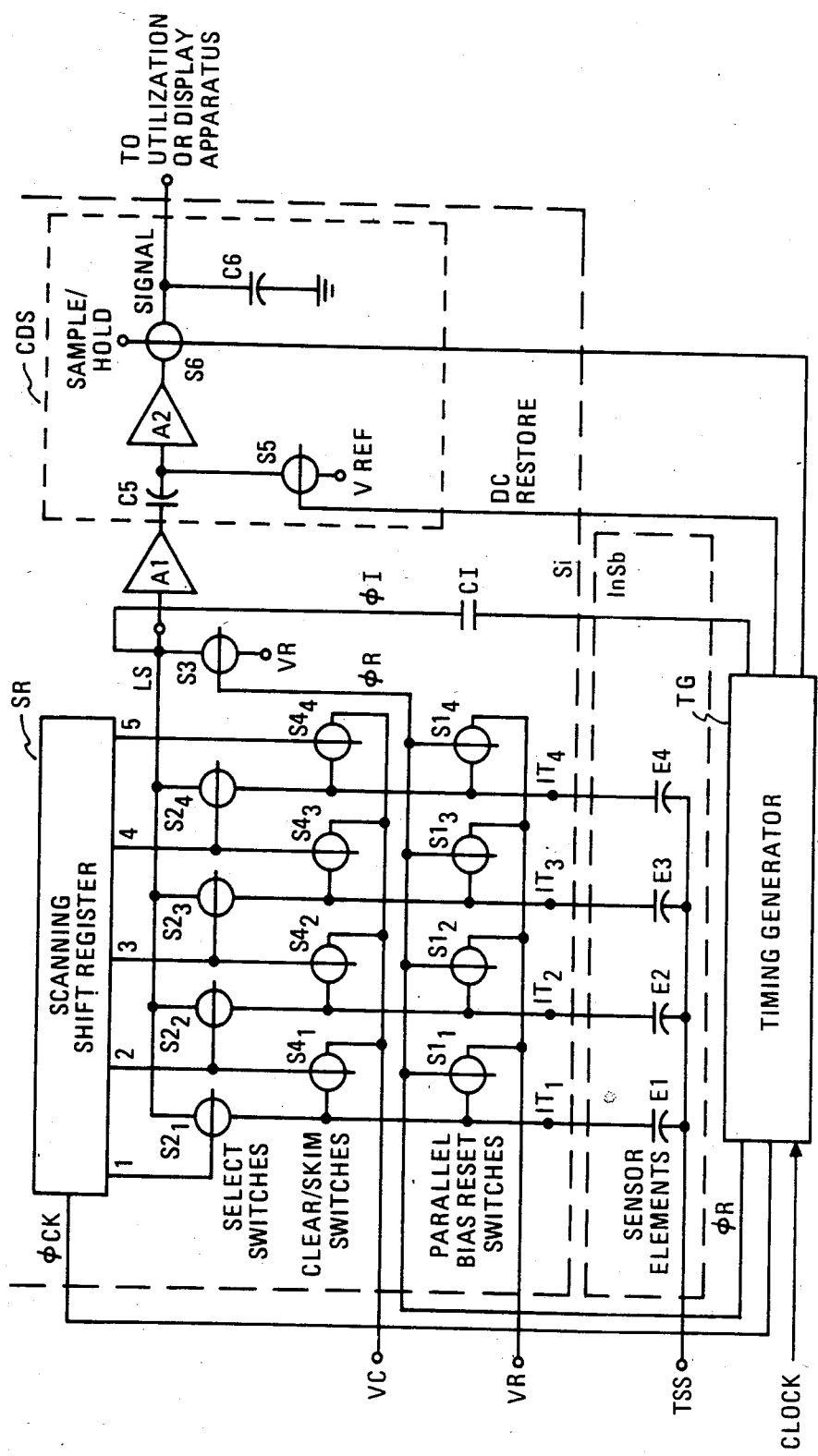
FIG. 8 is a diagram of a charge injection device (CID) for IR sensing including an IR sensor and a novel AC-coupled injection (ACI) readout circuit which eliminates readout circuit "lag" of a CID device.

So far the read and clear/skim operation has been described using the DC-coupled injection (DCI) i.e., charge injection achieved by the equalization of the two voltage sources VA and VB. The same novel readout is equally applicable to the conventional CID with AC-coupled injection (ACI), in which case the functional diagram of FIG. 8 is the same as FIG. 1 with the addition of an injection coupling capacitor (CI) to the sensing line (LS). The two voltage sources are now set to a common reset voltage, VA=VB=VR. External injection pulses phi I are coupled through CI to the sensing line and sensor elements during the time the select switch (S2) is closed. The waveforms by which AC-coupled injection is performed are illustrated in FIG. 9. The reset waveform which controls switches S1 and S3 are as before occurring during the first three clock intervals. This is followed by the closing of the select switch S2$_j$ driven by the scanning shift register (SR), which connects the sensing line (LS) to the jth sensor element during clock interval 4 through 16. The first sample starts from the beginning of the readout interval and completes at the end of the sixth clock interval. Immediately following the completion of the first sample, the injection pulse occurs from clock interval 7 to 13. Finally, the second sample takes place during clock interval 14 through 16, which concludes the readout interval of jth sensor element. The clear/skim operation works exactly the same way as previously described.

In addition to the "reach-back" read and clear/skim readout circuit and method, an alternative implementation of the novel readout can be described as follows. Instead of using the n clear/skim switches (S4$_{1-n}$) as shown in FIG. 1, a single clear/skim switch (S4) is added to the sensing line in parallel with the reset switch (S3). The scanning shift register (SR) output is solely used to drive the select switches (S2$_{1-n}$). The second sample of the readout of jth sensor element described above is now taken at the midpoint (as compared to the end in the "reach-back" approach) of the injection time when the select switch S2$_j$ is closed (DCI). Right after the second sample is completed, the clear/skim voltage source (VC) is applied to the sensing line and the jth sensor element by turning on the clear/skim switch (S4) while the select switch S2$_j$ is still closed. In this case, the readout and clear/skim operation is completed in one readout interval and can be called "sequential read and clear/skim".

The novel readout circuit and method applies to the CID in general, including infrared sensor using InSb or HgCdTe and visible sensor using Si as the substrate semiconductor. It is also applicable to the linear as well as to two dimensional array.

What is claimed is:

1. In a charge injection device (CID) for optical sensing eliminating readout circuit lag, the combination comprising
   A. n optical sensor elements (E$_{1-n}$) arranged in an array on a substrate, each element equivalently representable by a capacitor, diode, and battery network, which when reversely biased to a suitable voltage (VB) forms a potential well in which bias charges are maintained, and as a function of optical irradiance, photon induced signal charges are stored, and
   B. a readout circuit comprising
      (1) n input terminals (IT$_{1, 2, 3 \ldots n}$) each connected to one of said n sensor elements E$_{(1-n)}$, a node including a sensing line, and a signal output terminal,
      (2) a first voltage source (VB) and n controllable reset switches (S1$_{1, 2, 3 \ldots n}$), for periodically biasing said sensor elements to said charge storing voltage (VB),
      (3) amplification means (A1) having the input thereof coupled to said node, said node exhibiting a capacitance, and an output
      (4)
         (i) a second voltage source (VA) having a value selected to remove charge from said potential wells and
         (ii) a reset switch (S3) for periodically resetting said node to said second voltage,
         the resetting of said sensor elements and said node to said first and said second voltages, respectively, occurring simultaneously as the first step in the readout sequence of each sensor element,
      (5)
         (i) a third voltage source (VC) having a value selected to remove signal charge remaining in the wells after readout or in excess of said value to skim the bias charge, and
         (ii) n controllable clear/skim switches (S4$_{1, 2, 3, \ldots n}$) for periodically clearing or clearing and skimming each sensor element
      (6) timing means including
         (i) a scanning shift register providing an output establishing successive sensor readout intervals and successive clearing or clearing and skimming intervals, and
         (ii) n element select switches (S2$_{1, 2, 3 \ldots n}$) controlled by said register for connecting successive sensor elements for readout to said node to inject the charges stored in said wells into the substrate as the voltage at said node and the selected sensor element equalize at a voltage dependent on optical intensity, said injection being the second step in the sensor readout sequence,
      the (jth) timing means output being coupled to the jth select switch for defining the readout interval for the jth sensor and to a prior (e.g. (j−1)th) clearing or clearing and skimming switch for causing clearing or clearing and skimming operation on said prior (e.g. (j−1)th) sensor element, and thereby clearing or clearing and skimming each sensor element after readout on the following sensor readout interval, and (7) a correlated double sampling circuit whose input is connected to the output of said amplification means, and whose output is connected to said signal output terminal for taking a first voltage sample following reset, but prior to injection, and a second voltage sample during injection, the readout value for the selected sensor representing the difference between said first and second sample voltages.

2. The combination set forth in claim 1, wherein said timing means causes (1) the first and second steps of readout to occur for the jth element on the (jth) timing means output, and (2) the clearing or clearing and skimming step for the jth element to occur on the (j+1)th timing means output.

3. An improved method of operation of a charge injection device (CID) for optical sensing eliminating readout circuit lag in which the CID comprises n optical sensor elements arranged in an array on a common substrate, each sensor element when reversely biased to a first voltage forming a potential well in which, as a function of optical irradiance, photon induced signal charges are stored, a readout circuit having n input terminals, each connected to a sensor element, amplification means, and a node connecting a sensing line and the input of said amplification means, said node (having a capacitance), the steps of (1) simultaneously biasing all sensor elements to said first voltage and said node to a second voltage, said second voltage having a value suitable for removing charge from the potential wells of said sensor elements, (2) obtaining a first sample of the voltage on said node at the output of said amplification means after said node has been reset to said second voltage but prior to the following step, (3) injecting optically induced charges stored in a selected jth sensor element into said substrate by connecting said selected sensor element to said node to cause the voltage on said node and on said selected sensor element to equalize, (4) obtaining a second sample of the voltage on said node at the output of said amplification means during injection which when combined subtractively with the first sample provides the readout value for the jth sensor element, and (5) terminating injection and repeating steps 1, 2, etc. for the (j+1)th sensor element, until n sensor elements have been readout, (6) clearing or clearing and skimming optically induced charges stored in said jth sensor element while a subsequent sensor element is being read out by connecting said selected sensor element after readout (after step 4) to a third voltage selected to clear or clear and skim charge remaining after readout from said jth sensor element, and repeating said process, until n sensor elements have been cleared.

4. The improved method of claim 3 wherein (1) readout (ie, steps 2, 3, 4) occur for the jth element of the (jth) timing means output, and (2) the clearing or clearing and skimming (ie, step 6) for the jth element occurs on the (j+1)th timing means output.

5. In a charge injection device (CID) for optical sensing eliminating readout circuit lag, the combination comprising A. n optical sensor elements ($E_{1-n}$) arranged in an array on a substrate, each element equivalently representable by a capacitor, diode, and battery network, which when reversely biased to a suitable voltage (VR) forms a potential well in which bias charges are maintained, and as a function of optical irradiance, photon induced signal charges are stored, and B. a readout circuit, comprising (1) n input terminals ($IT_{1, 2, 3 \ldots n}$) each connected to one of said n sensor elements $E_{(1-n)}$, a node including a sensing line, and a signal output terminal, (2) a first voltage source (VR) and n controllable reset switches ($S1_{1, 2, 3 \ldots n}$), for periodically biasing said sensor elements to said charge storing voltage (VB), (3) amplification means (A1) having the input thereof coupled to said node, said node exhibiting a capacitance, and an output (4) reset switch (S3) for periodically resetting said node to said first voltage (VR), the resetting of said sensor elements and said node to said first voltage, occurring as the initial step of four steps in the readout sequence of each sensor element, (5)
(i) a second voltage source (VC) having a value selected to remove signal charge remaining in the wells after readout or in excess of said value to skim the bias charge, and (ii) n controllable clear/skim switches ($S4_{1, 2, 3, \ldots n}$) for periodically clearing or clearing and skimming each sensor element (6) timing means including (i) a scanning shift register providing an output establishing successive clearing or clearing and skimming intervals, and (ii) n element select switches ($S2_{1, 2, 3 \ldots n}$) controlled by said register for connecting successive sensor elements for readout to said node, during the time the select switch is closed, (iii) a capacitor (CI) connected to said node for coupling an injection pulse (phi I) to said node and a selected sensor element as a third step in the readout sequence, the (jth) timing means output being coupled to the jth select switch for defining the readout interval for the jth sensor and to a prior (e.g. (j−1)th) clearing or clearing and skimming switch for causing clearing or clearing and skimming operation on said prior (e.g. (j−1)th) sensor element, and thereby clearing or clearing and skimming each sensor element after readout on the following sensor readout interval, and (7) a correlated double sampling circuit whose input is connected to the output of said amplification means, and whose output is connected to said signal output terminal for taking a first voltage sample as a second step following reset and during selection, but prior to injection, and a second voltage sample after injection as a fourth step, the readout value for the selected sensor representing the difference between said first and second sample voltages.

6. The combination set forth in claim 5, wherein said timing means causes (1) the readout to occur for the jth element on the (jth) timing means output, and
(2) the clearing or clearing and skimming step for the jth element to occur on the (j+1)th timing means output.

7. An improved method of operation of a charge injection device (CID) for optical sensing eliminating readout circuit lag in which the CID comprises n optical sensor elements arranged in an array on a common substrate, each sensor element when reversely biased to a first voltage forming a potential well in which, as a function of optical irradiance, photon induced signal charges are stored, a readout circuit having n input terminals, each connected to a sensor element, amplification means, and a node connecting a sensing line and the input of said amplification means, said node having a capacitance, the steps of
   (1) simultaneously biasing all sensor elements and said node to a first voltage (VR),
   (2) selecting a jth sensor element for readout by connecting said selected sensor element to said node,
   (3) obtaining a first sample of the voltage on said node at the output of said amplification means after reset of said node and selection of the jth sensor element,
   (4) injecting optically induced charge stored in the jth sensor element into said substrate by capacitively coupling an injection pulse (phi I) to said node and said jth sensor element,
   (5) obtaining a second sample of the voltage on said node at the output of said amplification means after injection which when combined subtractively with the first sample provides the readout value for the jth sensor element, and
   (6) terminating readout and repeating steps 1, 2, etc. for the (j+1)th sensor element, until n sensor elements have been readout,
   (7) clearing or clearing and skimming optically induced charges stored in said jth sensor element while a subsequent sensor element is being read out by connecting said selected sensor element after readout to a second voltage (VC) selected to clear or clear and skim charge remaining after readout from said jth sensor element, and repeating said process, until n sensor elements have been cleared.

8. The improved method of claim 7 wherein
   (1) readout (ie, steps 1–5) occur for the jth element of the (jth) timing means output, and
   (2) the clearing or clearing and skimming (ie, step 7) for the jth element occurs on the (j+1)th timing means output.

* * * * *